UNITED STATES PATENT OFFICE.

BENJAMIN SADTLER, OF DENVER, COLORADO, ASSIGNOR TO ALBERT G. CLARK, OF CINCINNATI, OHIO.

PROCESS OF TREATING ORES FOR RECOVERY OF METALLIC INGREDIENTS.

SPECIFICATION forming part of Letters Patent No. 656,268, dated August 21, 1900.

Application filed July 13, 1899. Serial No. 723,693. (No specimens.)

*To all whom it may concern:*

Be it known that I, BENJAMIN SADTLER, of the city of Denver, county of Arapahoe, State of Colorado, have invented a certain new and Improved Process of Treating Ores for the Recovery of Metallic Ingredients, of which the following is a specification.

The object of my invention is to provide a means for the economical recovery of gold, silver, and other valuable ingredients from ores which by reason of the presence of iron or other oxids and zinc in substantial quantities it has been impracticable to treat in either of the customary methods of reducing ores and which therefore, though often containing minerals worth in the aggregate thirty or forty dollars a ton or even larger amounts have remained as waste. Valuable quantities of precious metals, such as gold and silver, are often locked up in ores of this composite character; but iron oxid, if present to the amount of five per cent. or more, excludes their reduction by the means used in zinc distillation, since the iron oxid when exposed to the heat required for such distillation slags with and corrodes the fire-clay of which the retorts are composed, destroying them and creating such chemical combinations as interfere with the further separation of the ores, thus stopping the process of releasing and recovering the several valuable metals contained therein. If, on the other hand, an effort be made to treat such ores in blast-furnaces such as are commonly used for smelting ore carrying gold and silver, the zinc therein is vaporized and, encountering the air-blast, is precipitated as a crust upon the walls of the furnace, speedily choking it, obstructing and finally stopping the operation of the furnace. In consequence of the above-named conditions there are large quantities of such ores containing valuable percentages of gold, silver, and other metals, but having in their composition both iron oxids and zinc, (each valuable if separated,) which it it has been impossible to economically work by any heretofore-known process and which therefore have remained as waste.

I have discovered that such ores can be economically treated by first distilling out the zinc under conditions which exclude the mischievous chemical combinations above referred to, thereby freeing such ores from zinc and obtaining the residue in such condition as admits of ready separation in a smelting-furnace and thereafter passing such residue to a smelting-furnace and further reducing it and separating its ingredients. I effect this distillation in retorts composed of materials which resist at once the corrosive action of the ores and the abrading action of the tools, while having sufficient strength or tenacity throughout their body to withstand the strain to which such use exposes them and of such composition as to readily transmit heat through their walls. After eliminating and recovering the zinc by such distillation I pass the residue to a smelting-furnace and further reduce them in the manner commonly practiced when smelting precious-metal ores wherein iron oxid serves as a flux.

It will be observed that in order to effect the desired elimination of the zinc by distillation and at the same time avoid such chemical reaction at this stage of the operation as would interfere either with the proper recovery of the zinc or with the delivery of the other ingredients to the subsequent treatment in the proper condition to facilitate their ready and economical separation it is important that the retort in which the distillation occurs be of such a nature as to prevent the oxids or other corrosive agents in the ores from chemically combining with the acid constituents of the retort. Hence care must be observed that during the period of distillation the ores in the retort be excluded from access to the fire-clay constituents of the retort. If, for instance, these ores were during distillation brought in contact with the fire-clay, which gives tenacity and fire-resisting qualities to the retort, (either by reason of such fire-clay forming the inner surface of the retort or by reason of fractures, cracks, or scratches through such lining as may be interposed, whether resulting from abrasions or from contraction and expansion due to changes of temperature,) so as to admit chemical action of the oxids in the ore upon the fire-clay of the retort, the resulting combination would interfere both with the recovery of the zinc in available condition and with the qualifications of the precious metal-bearing residue for economic separation in the subsequent treatment. If such chemical action occurs during the distillation, the silicate thus formed arrests the elimination of the zinc both by taking zinc into its combination chemically and by softening or gumming the charge, so as to mechanically hold and prevent the escape of the zinc-vapor, preventing the recovery thereof as well as the release of the remaining metals necessary for the economic treatment of the residue and materially reducing the yield of zinc. This silica at the same time combining with the iron in the residue deprives it of its efficiency as a flux in facilitating the separation of the precious metals in the smeltering operation, its properties as a flux being destroyed by combining with silica. These reactions would also by opening vents in the retort admit access of air, instantly stop the distillation, at the same time rendering the entire operation ineffectual, because destroying the retort and spilling its contents. Where the ores contain sulfur, it should prior to distillation be removed by roasting in the ordinary way. This distillation, for reasons already indicated, cannot be carried on in retorts of the character commonly used in zinc distillation, since the chemical actions which would take place in such retorts would be fatal to the further carrying out of my process. The best means known to me for effecting this step in the process consists of a retort invented by me and more particularly described in an application for patent filed by me in the United States Patent Office contemporaneously with this and bearing the Serial No. 723,699. This retort is produced by forming its body of fire-clay or equivalent material, then applying to its inner surface (and preferably also to the more exposed portions of its outer surface, such as the top,) a sintering material, such as silicate of soda, adapted to chemically combine with the fire-clay and also with the basic material under suitable firing, then applying a lining or coating of basic material—such as burnt bolomite, calcined magnesite, or analogous substance, preferably treating the upper outside surface in the same way—then subjecting the entire body immediately before using to firing in a kiln or in the furnace itself at a temperature ranging about 1,500° Fahrenheit for two or three days. While this retort is better adapted to the purpose of this process than any other known to me, I do not confine myself thereto, the essential condition of this stage of the operation being that the distillation be conducted under such conditions as exclude the corrosive action and mischievous chemical combinations which would result if the oxids or corrosive agents have access to the fire-clay or other ingredients of the retort for which they have chemical affinity and in combination with which their action would be destructive.

I claim—

1. The improvement in the process of treating ores, wherein zinc is combined with iron or other agents which attack fire-clay, consisting in distilling such ores in a retort wherein chemical reactions between the ingredients of the ores and of the retort are excluded, and thereafter treating the residue from such distillation for the extraction of metallic ingredients, substantially as described.

2. The herein-described improvement in the process of treating ores wherein precious metals are combined with zinc and iron or other corrosive agents, consisting in distilling such ores in a retort adapted to resist the action of such corrosives, thereby extracting the zinc, and thereafter treating the residue in a smelting-furnace for the recovery of the remaining metals, substantially as described.

BENJAMIN SADTLER.

Witnesses:
ALBERT G. CLARK,
M. SINCLAIR.

It is hereby certified that in Letters Patent No. 656,268, granted August 21, 1900, upon the application of Benjamin Sadtler, of Denver, Colorado, for an improvement in "Processes of Treating Ores for Recovery of Metallic Ingredients," an error appears in the printed specification requiring correction, as follows: In line 48, page 2, the word "bolomite" should read *dolomite;* and that the said Letters Patent should be read with this correction therein that the same may conform to the record of the case in the Patent Office.

Signed, countersigned, and sealed this 25th day of September, A. D., 1900.

[SEAL.]
F. L. CAMPBELL,
*Assistant Secretary of the Interior.*

Countersigned:
WALTER H. CHAMBERLIN,
*Acting Commissioner of Patents.*